Feb. 14, 1939. O. C. SCHMIDT 2,147,582
HASHING MACHINE
Filed March 25, 1937 2 Sheets-Sheet 1
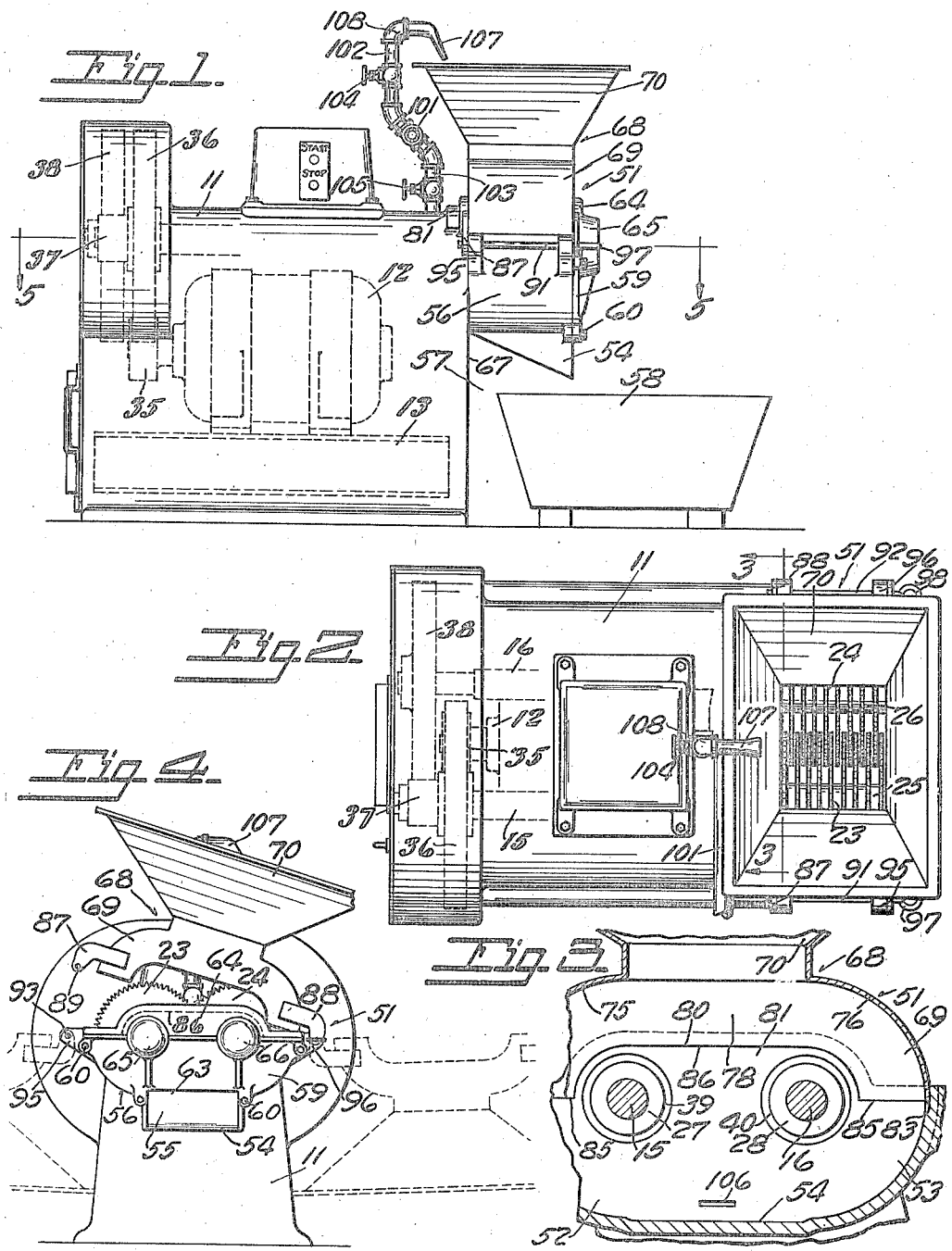
INVENTOR:
Oscar C. Schmidt Feb. 14, 1939.  O. C. SCHMIDT  2,147,582
HASHING MACHINE
Filed March 25, 1937  2 Sheets-Sheet 2
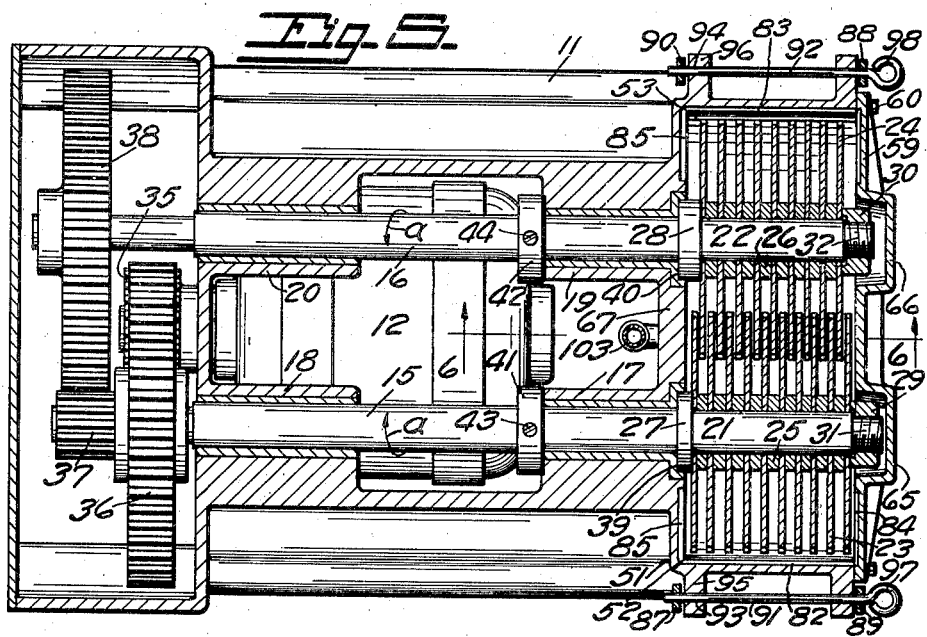
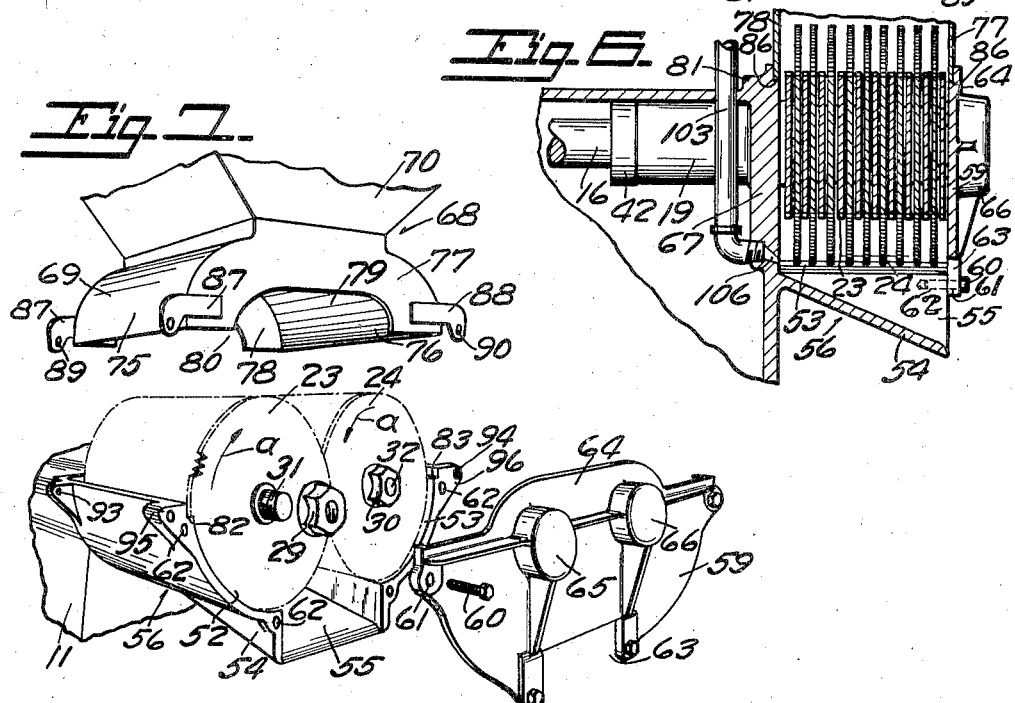
INVENTOR:
Oscar C. Schmidt, Patented Feb. 14, 1939

2,147,582

UNITED STATES PATENT OFFICE 2,147,582

HASHING MACHINE

Oscar C. Schmidt, Cincinnati, Ohio, assignor to The Cincinnati Butchers' Supply Company, Cincinnati, Ohio, a corporation of Ohio Application March 25, 1937, Serial No. 133,038

8 Claims. (Cl. 146—122)

The present invention relates to hashing machines of the type used principally for hashing entrails and other viscera parts and offal, but is employable for other purposes.

In machines of the character mentioned it is usual to provide sets of rotating cutters, ordinarily saws or knives, or both, mounted on spaced apart parallel shafts, the sets of saws or knives, or hasher blades, coacting with each other to cut and hash the material. In operation the material to be hashed is usually fed to the sets of rotating hasher blades from above, as through a hopper, and after being hashed, the material passes out from between the sets of hasher blades at the lower side thereof. It will be understood that these machines are used for hashing perishable products and frequent and thorough cleaning of the machines is necessary to maintain the same in sanitary condition. In practice these machines are made in ever increasing sizes, and great difficulty is experienced in cleaning all parts of such large machines.

It is the object of my invention to provide new and improved means in a machine of the character mentioned for mounting and housing the hasher blades, be they saws or knives or both, whereby the same are rigidly supported and are readily accessible for sharpening and cleaning purposes; and, further, to provide novel means whereby to mount the hasher blades in a meat passage all portions of which are readily accessible.

My invention consists in providing hasher shafts having substantial bearings and overhanging blade carrying ends so that the bearings need not be disturbed when inspecting, inserting or removing the blades; further, in providing a material passage with a removable wall for exposing the hasher blades; further, in providing a trough in which sets of coacting hasher blades rotate and which has a movable end for exposing the hasher blades; further, in providing such trough with a movable cover including a hopper for exposure of the hasher blades from above; further, in providing a frame in which the bearings for the hasher shafts and the main portions of the hasher shafts are located and having an overhanging bracket in which the hasher blades are located on overhanging ends of the hasher shafts outside said bearings; and, further, in providing novel flushing means for the meat passage and the hasher blades.

My invention consists, further, in providing novel means for housing and for supporting the hasher blades to permit their ready removal without dismantling the machine.

In the drawings:

Fig. 1 is a side elevation of a hashing machine embodying my invention.

Fig. 2 is a plan view of the same, with the upper nozzle shown in normal position in full lines and in assumed position in dotted lines.

Fig. 3 is a cross-section of the same, taken on the line 3—3 of Fig. 2, and partly broken away.

Fig. 4 is an end elevation of the same with the upper housing section partly tilted to one side in full lines, and shown fully tilted to opposite sides in dotted lines, and partly broken away.

Fig. 5 is a horizontal section of my improved device, taken on the line 5—5 of Fig. 1.

Fig. 6 is a vertical section, taken in the plane of the line 6—6 of Fig. 5, and partly broken away; and, Fig. 7 is a perspective view of my improved device, partly broken away, showing the movable portions of the housing section in moved positions to expose the interior of the material passage and the hasher blades.

The machine embodying my invention comprises a main frame 11 in which a motor 12 is suitably mounted, as on supporting members 13 secured in the frame. Hasher shafts 15 and 16 are respectively rotatably journaled in bearings 17, 18 and 19, 20, in the main frame.

The bearings of the respective shafts are substantial long bearings and are spaced apart for distributing the journal portions of said shafts over a large portion of the length thereof. The shafts have overhanging ends 21, 22, at one of the ends thereof at one of the ends of the collective bearings.

Hasher blades 23, 24 are secured to said overhanging ends. They are exemplified as saws, but may be circular knives, or the cutters on one shaft may be saws and on the other shaft be circular knives, or other suitable arrangement of hasher blades may be provided.

The blades 23 are spaced apart on the shaft 15 by spacing collars 25 received over the shaft between adjacent blades, and the blades 24 are spaced apart on the shaft 16 by spacing collars 26. The blades 23 and 24 overlap at the adjacent portions of their cutting peripheries, the blades on one shaft being received in the spaces between blades on the other shaft. The blades and collars are securely clamped to the overhanging ends of the respective shafts between flanges 27, 28 on said respective shafts and nuts 29, 30, threaded over the reduced oppositely threaded ends 31, 32 of said respective shafts.

The hasher shafts are rotated in opposite directions, the upper portions of their cutting peripheries rotating toward each other. Thus, the motor shaft is provided with a pinion 35 fixed thereon, which meshes with a gear 36 fixed to the shaft 15. A pinion 37 is also fixed to the shaft 15 and meshes with a gear 38 fixed to the shaft 16. It will be apparent from the gearing arrangement shown that the shafts 15 and 16 rotate in opposite directions and at different speeds. For instance, the shaft 15 rotates at high speed, approximately five hundred revolutions per minute, and the shaft 16 rotates at low speed, approximately one hundred revolutions per minute. Material dropped on the top of the cutters is fed by them toward the overlapping portions thereof and is finely cut and shredded and passed out at the under side of the cutters.

Means are provided to position the shafts 15 and 16 endwise, shown as the flanges 27, 28 on said respective shafts, received in pockets 39, 40 at one end of the bearings 17 and 19, and held in said pockets by collars 41, 42, secured in adjusted positions on the respective shafts at the other end of said bearings by clamp screws 43, 44. Juice tight joints are thereby formed between said shafts and said bearings.

The hasher blades rotate with their upper portions moving toward each other, as indicated by the arrows *a*. They rotate in opposite directions in a housing 51 comprising troughs 52, 53 having a gutter 54 extending longitudinally thereof between the same, the gutter slanting downwardly and outwardly and having a mouth 55. The respective sets of hasher blades rotate in the respective troughs and the adjacent portions of the hasher blades rotate toward the gutter therebelow to feed the hashed material into the gutter.

The troughs and gutter are shown as an overhanging bracket 56 extending from the frame and forms a space 57 thereunder into which a receptacle 58 to receive the hashed material from the gutter may extend.

The outer ends of the troughs are open and are arranged to be closed by a movable end plate 59, removably secured to the bracket 56 by bolts 60 located in holes 61 in the end plate and threaded into threaded holes 62 in the bracket. The end plate is provided with a recess 63 at the outer end of the trough. The end plate has an upward extension 64 at its middle portion extending above the level of the hasher shafts, and is provided with pockets 65, 66, into which the threaded ends of shafts and the nuts thereon extend when the end plate is in place.

The end wall 67 of the frame, the movable end plate and the side walls of the troughs are closely adjacent to the sets of hasher blades when the latter rotate, and form the lower portion of the material housing 51, which is provided with a movable housing section 68 comprising a movable cover 69 provided with a hopper 70. The cover has side walls 75, 76 and end walls 77, 78, the latter provided with upwardly extending recesses 79, 80, which conform to the shape of the upper margin of the upwardly extending portion of the movable end plate. The wall 67 of the frame has a formation similar to the formation of the upper margin of the movable end plate including the upper margins of the inner ends of the troughs and an upwardly bulged portion 81 therebetween.

The outer side walls of the troughs are provided with seats 82, 83, and the end walls of the troughs are provided with seats 84, 85, these seats being in substantially the same horizontal plane in which the axes of rotation of the hasher shafts are located. The lower margins of the side walls of the cover and of the end walls of the cover above the troughs are received in said seats and form connecting margins or lapping joints therewith. The upward extension 64 of the movable end plate and the corresponding portion 81 of the wall 67 of the frame are provided with seats 86 for receiving the lower margins of the walls of the recesses 79, 80 to form connecting margins or lapping joints therewith. These lapping joints form juice tight joints between the cover and the lower portion of the housing to prevent escape of the juices and liquid passing through the housing.

The material to be hashed is placed in the hopper, which discharges upon the upper portions of the hasher blades, which feed the material toward the overlapping downwardly moving portions of the hasher blades. The walls of the cover are closely adjacent to the cutting peripheries of the hasher blades, and with the troughs and their end walls form a material passage in which the hasher blades operate and which confines the material and continuously urges it toward the hasher blades, the hashed material from the hasher blades discharging into the trough therebelow.

The movable housing section is provided with releasable securing means at each side, which are shown as releasable pivot means. The movable housing section is provided with ears 87, 88 at its respective sides having holes 89, 90. Pivot rods 91, 92 are located in these holes and in mating holes 93, 94 in ears 95, 96 on the outer side walls of the troughs. These rods are provided with handles 97, 98. When the pivot rods are located in the holes the movable housing section is securely held in place. When either pivot rod is removed the movable housing section may be swung on the other of said pivot rods for exposing the cutter blades, as shown for instance in full lines and in dotted lines in Fig. 4, or both pivot rods may be removed for removal of the movable housing section as indicated in Fig. 7.

The movable end plate 59 may also be removed by removing the releasable bolts 60, for exposing the ends of the respective sets of hasher blades and their clamping means for such attention as may be desired, or for removal and reinsertion of the hasher blades.

Either the movable housing section or the movable end plate may be moved or removed without movement or removal of the other, or both the movable housing section and the end plate may be independently moved or removed, for full exposure of the hasher blades, the hasher shafts and their securing means, and removal of the same, so as to expose all the walls of the material passage, for cleaning purposes or other attention to the parts, or for sharpening of or other attention to the blades either while on their overhanging shaft ends or while removed therefrom.

A water pipe 101 is provided with branches 102, 103 having regulating and shut-off valves 104, 105 therein, and provided with nozzles 106, 107. The nozzle 106 is projected lengthwise of the gutter 54, feeding into the upper end of the same. The nozzle 107 is on a movable pipe section 108. It normally discharges into the hopper 70, as shown in full lines in Figs. 1 and 2, but may be swung out of the range of movement of the movable housing section 66, as shown in dotted lines in Fig. 2, when it is desired to tilt said section.

The water or other liquid employed may be discharged with desirable force into the hopper and the gutter during the hashing operation, and also after the hashing is completed to aid in cleaning the machine while rotating the hasher blades or allowing the same to be at rest.

I claim:

1. In a hashing machine of the character described, the combination of coacting sets of rotary hasher blades rotatable in opposite directions and having the adjacent portions of their cutting peripheries overlapping, a trough in which said hasher blades rotate with said overlapping portions of said blades moving downwardly, the upper limit of said trough being located in substantially the horizontal plane in which said hasher blades are located, said trough having movable end plate the movement of which exposes the lower portions of the ends of said sets of rotary hasher blades, and a cover including a hopper for said trough located above said blades and movable to expose said blades from above, said cover having a depending end wall which end wall and said movable end plate cover the ends of said sets of rotary hasher blades and have a parting line between them in the horizontal plane in which said sets of hasher blades are located when said cover and said movable end plate are in normal positions, said cover and said end plate movable in angularly different directions for exposure of said sets of hasher blades.

2. In a hashing machine of the character described, the combination of a frame formed with oppositely presented troughs, coactive hasher shafts, bearings in said frame solely at one end of said troughs for said respective hasher shafts, driving means for said shafts at said last-named end of said troughs outside said troughs, said shafts having overhanging ends in said troughs outside said bearings, sets of spaced-apart hasher blades releasably secured to said respective overhanging ends in such relation that the adjacent cutting peripheral portions of the blades of said respective sets are located in the spaces between the blades of the other of said sets, the upper ends of said troughs and said hasher shafts being located in substantially the same horizontal plane, said shafts rotatable in opposite directions by said driving means, an end plate across the outer ends of said troughs distanced from said driving means, and a cover for said troughs, said cover including a hopper and depending marginal walls, said marginal walls having connecting margins throughout their lower boundaries in substantially the horizontal plane in which said hasher blades are located, and said frame and said end plate provided with seats for said connecting margins whereby to encompass said hasher blades, said cover and said end plate being movable independently of each other to expose said hasher blades during maintenance of said bearing and drive connections with said shafts.

3. In a hashing machine of the character described, the combination of a frame having an overhanging end formed as a trough provided with a gutter lengthwise in its middle portion, a pair of hasher shafts in substantial horizontal arrangement, bearings in said frame to operatively support and journal said hasher shafts and constructed to provide said shafts with overhanging blade supporting ends in said trough outside said bearings at the respective sides of said gutter, coacting sets of spaced-apart hasher blades on said overhanging ends the adjacent cutting peripheral portions of which overlap above said gutter and rotate toward said gutter, and end plate covering the lower portion of the outer ends of said sets of hasher blades and extending above and below said shafts to close the outer overhanging end of said trough releasably secured to said outer overhanging end and movable to expose the lower portions of the outer ends of said sets of hasher blades, said end plate provided with a seat along its upper margin at the outer end of said trough, said frame provided with a corresponding seat at the inner end of said trough, and the upper margins of the lateral outer walls of said trough provided with seats between said first-named seats, all said seats located in the horizontal plane in which said hasher blades are located, and a movable cover having depending walls about the upper portions of said hasher blades, the lower margins of said depending walls being releasably seated in said seats, said cover with its depending walls movable away from said sets of hasher blades, said movements of said end plate and said cover freely exposing the upper portions and the ends of said sets of hasher blades.

4. In a hashing machine of the character described, the combination of a frame, bearings in said frame, coactive parallel hasher shafts journaled solely in said bearings and having overhanging ends outside said bearings, sets of spaced-apart hasher blades secured to said respective overhanging ends and overlapping each other between said overhanging ends, fixed troughs under said sets of blades whose inner walls are respectively arcuate closely adjacent to the lower outer peripheral portions of said respective sets, a gutter between and connecting with said troughs and extending lengthwise under said overlapping portions of said blades, the upper ends of said troughs being substantially in the horizontal plane in which said hasher shafts are located, a movable cover for said blades having side walls respectively arcuate and closely adjacent to the upper outer peripheral portions of said respective sets of blades and meeting said inner walls of said troughs and movable with relation to said troughs, said cover provided with a hopper above said gutter, the outer ends of said troughs being open, an end plate for said troughs to enclose the outer ends of the lower portions of said sets of hasher blades, said cover having a depending outer end wall, said outer end wall and said end plate having a partable joint between them located in the horizontal plane in which said hasher blades are located, means to movably support said cover for movement thereof away from said sets of blades in a direction substantially perpendicular to the axes of rotation of said blades, and means to releasably support said end plate on the outer ends of said troughs for movement thereof endwise with relation to said axes, and constructed and arranged for exposing the outer ends, the upper portions and the upper outer side portions of said sets of hasher blades during maintenance of positions of said hasher blades, said shafts and said troughs.

5. In a hashing machine of the character described, the combination of a frame, a pair of oppositely presented arcuate troughs thereon, a gutter between their lower portions, hasher shafts, bearings therefor on said frame at one end of said troughs, said hasher shafts having overhanging ends above said troughs and gutter, coacting sets of hasher blades on said overhanging ends, the inner faces of said arcuate troughs located closely adjacent to said respective sets of hasher blades, a cover for said troughs including a hopper and provided with depending lateral arcuate walls whose inner faces are closely adjacent to said respective sets of hasher blades and merge with said inner faces of said arcuate troughs, the outer ends of said arcuate troughs being open, an end plate to close said open-ended troughs and having an inner face closely adjacent to the lower portions of the outer ends of said sets of hasher blades, said cover provided with an outer end wall having an inner face closely adjacent to the upper portions of the outer ends of said sets of hasher blades and coacting with said end plate to cover the outer ends of said sets of hasher blades, said inner faces confining the material being hashed in the field of action of said coacting sets of hasher blades, said cover having a parting joint with the upper ends of said troughs and said end plate, and mounting means for said cover and said end plate for movement thereof away from said troughs to fully expose the upper portions and the ends of said sets of hasher blades.

6. In a hashing machine of the character described, the combination of a frame, a pair of oppositely presented arcuate troughs thereon, hasher shafts, bearings therefor on said frame at one end of said troughs to journalwise support said hasher shafts, said hasher shafts having overhanging ends above said troughs, coacting sets of hasher blades on said overhanging ends, securing means at the outer ends of said overhanging ends to secure said sets of hasher blades to said overhanging ends, the outer ends of said arcuate troughs being open, an end plate to close said open-ended troughs and extending above the level of said shafts and covering the lower portions of the outer ends of said sets of hasher blades, said end plate provided with an outwardly extending pocket structure to receive said securing means, a cover for said troughs and sets of hasher blades including a feeding opening and having lateral arcuate walls coacting with said arcuate troughs and an outer end wall coacting with said end plate to confine the material being hashed in the field of action of said coacting sets of hasher blades, and means to shiftingly mount said cover and said end plate for movement of said cover and said end plate to freely expose the upper portions and the outer ends of said sets of hasher blades whilst maintaining said journalwise support of said hasher shafts.

7. In a hashing machine of the character described, the combination of a frame, an open-ended trough supported thereby, bearings on said frame at one end of said trough, coactive hasher shafts journaled in said bearings so that their outer ends overhang said trough, coacting sets of hasher blades on said overhanging ends, means to rotate said shafts in opposite directions to move the proximate portions of said sets of hasher blades downwardly toward the middle of said trough, securing means coacting with the outer overhanging ends of said shafts to secure said respective sets of hasher blades to said overhanging ends, an end plate to close the open end of said trough, and releasable securing means to releasably secure said end plate across the open end of said trough, said end plate provided with a pocket structure in which said securing means for said respective sets of hasher blades are located when said end plate is so secured to locate the inner face of said end plate located about said pocket structure close to the outer ends of said sets of hasher blades to confine the material being hashed in the sphere of action of said hasher blades.

8. In a hashing machine of the character described, the combination of a frame, coacting hasher shafts, oppositely presented arcuate open-ended troughs and gutter therebetween on said frame extending lengthwise of said shafts, bearings on said frame at one end of said troughs for said hasher shafts, said hasher shafts journaled in said bearings so as to have overhanging ends above said troughs and gutter, coactive sets of hasher blades on said overhanging ends, securing means at the outer ends of said overhanging ends of said shafts to secure said sets of hasher blades thereon, said frame comprising an inner end wall for said troughs, a releasable outer end plate for said troughs provided with a lower recess for the outer end of said gutter and with a pocket structure in which said securing means are located when said end plate is in operative position, said end wall and said end plate provided with upward extensions above said shafts, the upper ends of said troughs, said end wall, said end plate and said upward extensions provided with joint faces surrounding said sets of hasher blades, a cover for said troughs provided with oppositely presented arcuate faces merging with said arcuate faces of said troughs and with end walls provided with upwardly extending recesses in which said upward extensions are located when said cover is closed, said cover including a feeding opening, the lower margin of said cover including the walls of said upwardly extending recesses provided with joint faces coacting with said first-named joint faces, and means for mounting said cover for movement transverse to said sets of hasher blades and means for releasably securing said end plate for movement away from said sets of hasher blades to fully expose substantially the upper halves and the whole of the outer ends of said sets of hasher blades while maintaining said hasher shafts and said sets of hasher blades in operative relations.

OSCAR C. SCHMIDT.